Nov. 5, 1946.  R. H. BREITHER ET AL  2,410,708
VARIABLE STROKE MECHANISM
Filed July 18, 1941  3 Sheets-Sheet 1
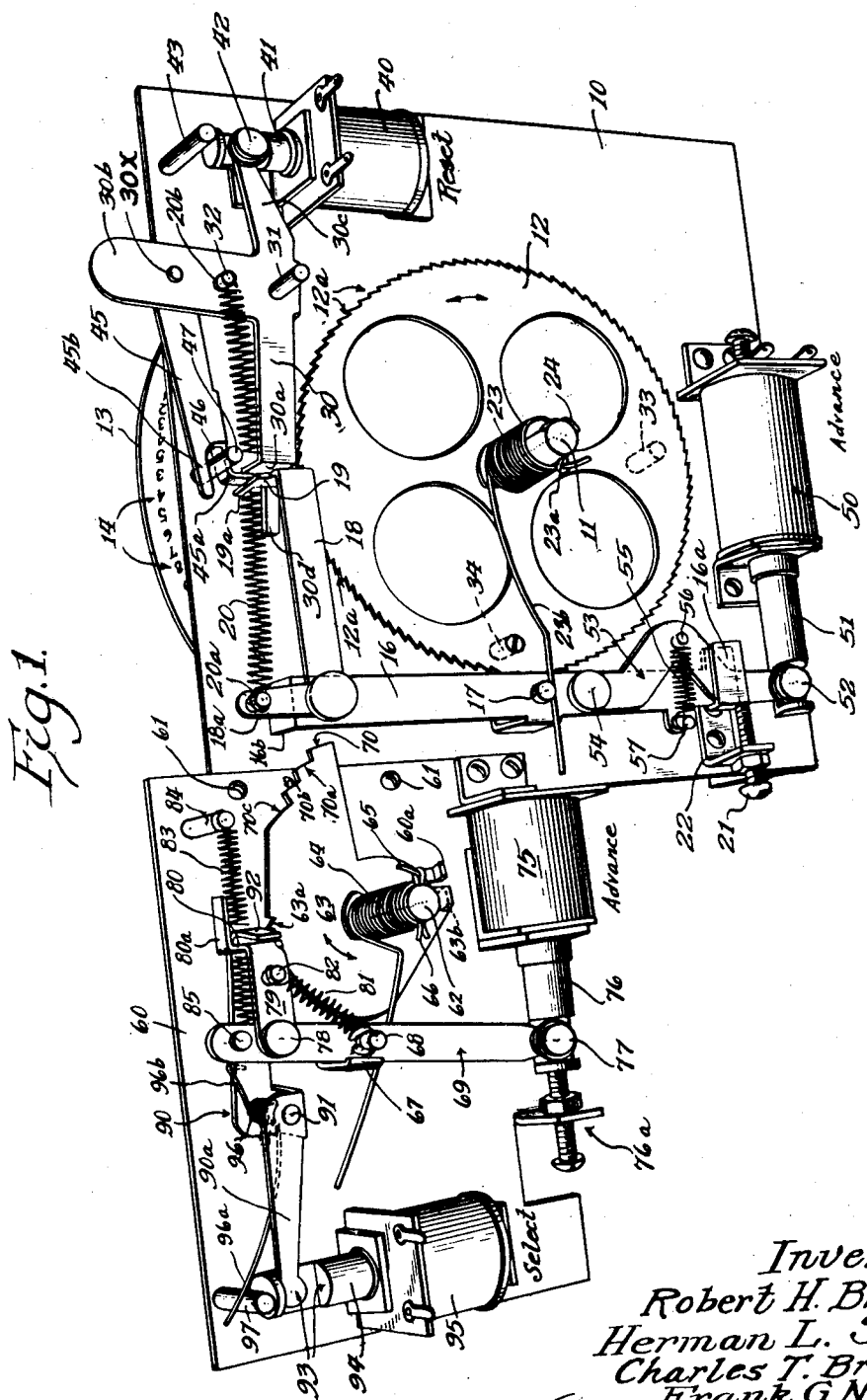
Inventors
Robert H. Breither
Herman L. Seiden
Charles T. Breitenstein
Frank G. Nicolaus
By Allen Livingston Attorney

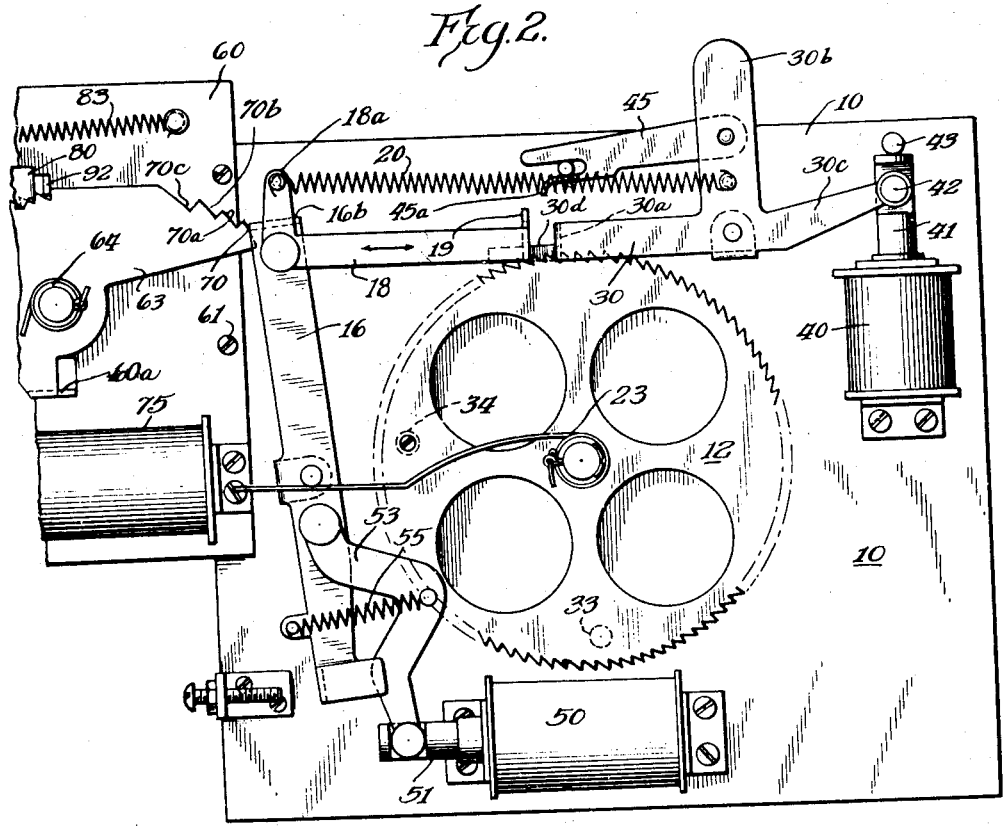
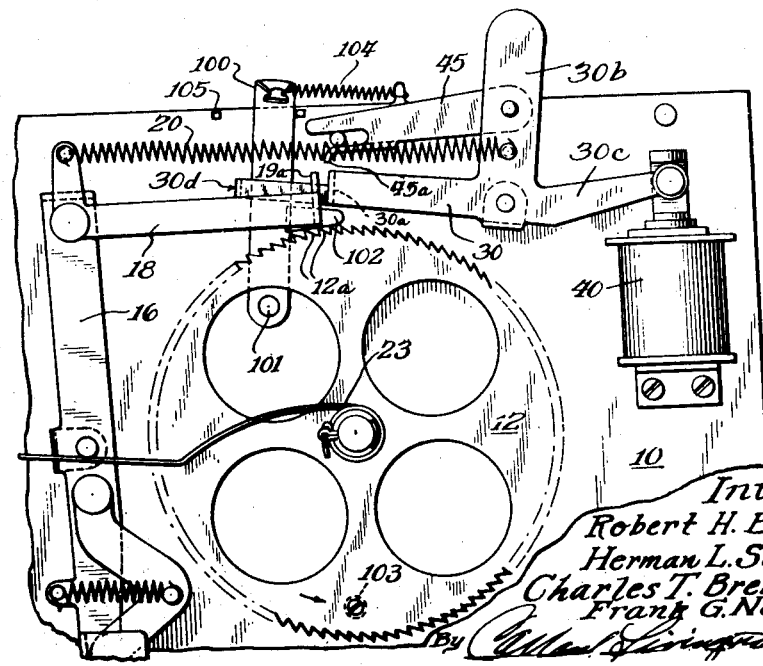

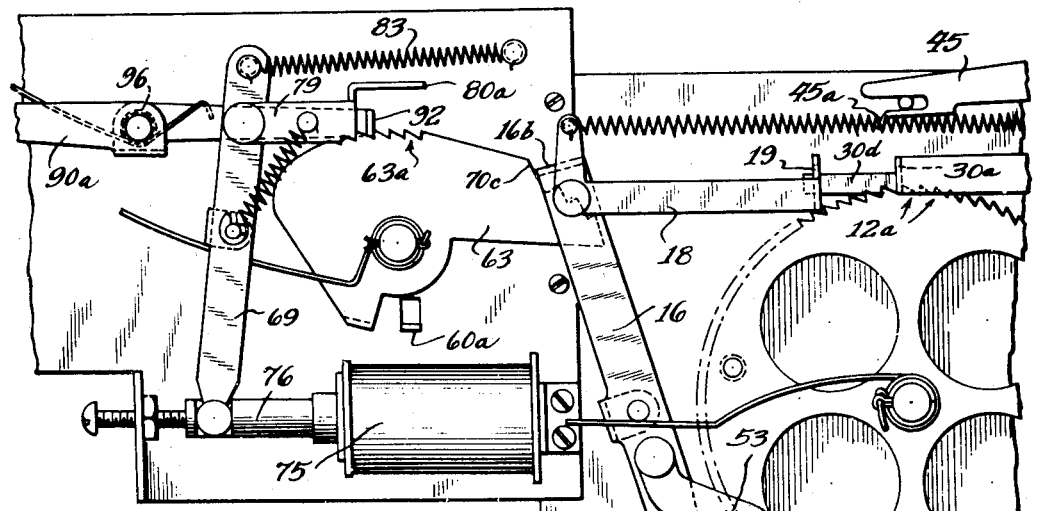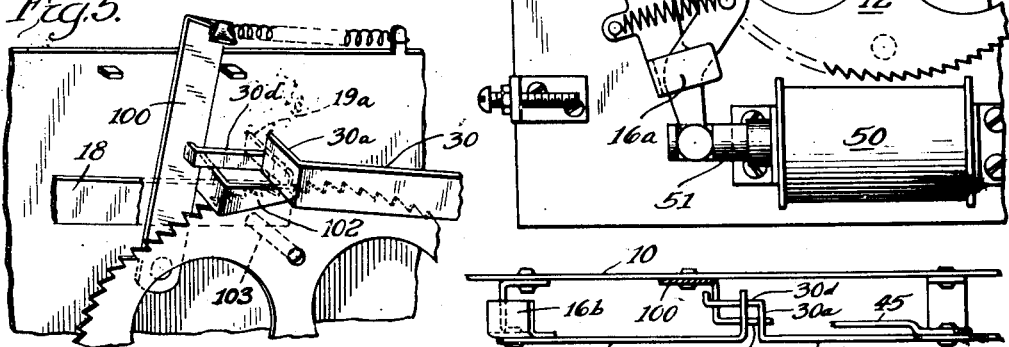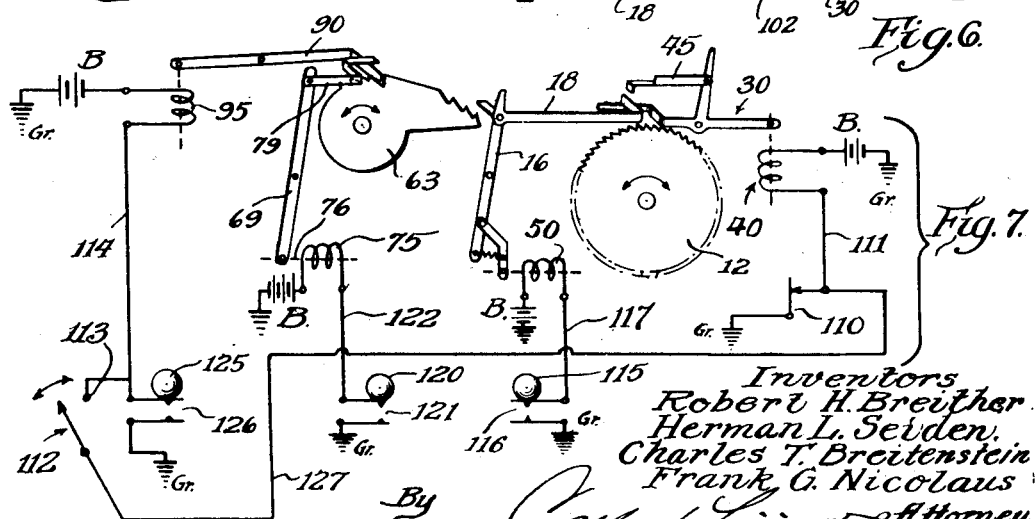

Patented Nov. 5, 1946

2,410,708

UNITED STATES PATENT OFFICE 2,410,708

VARIABLE STROKE MECHANISM

Robert H. Breither, Herman L. Seiden, Charles T. Breitenstein, and Frank G. Nicolaus, Chicago, Ill., assignors to Raymond T. Maloney, Chicago, Ill.

Application July 18, 1941, Serial No. 403,002

9 Claims. (Cl. 74—142)

This invention pertains broadly to mechanical movements and more particularly to step by step ratchet advancing means such as may be used with various kinds of indicating or control apparatus, for amusement devices.

A principal object of the invention is provision of a variable stroke step up mechanism especially suited for use with score indicators and the like in connection with amusement and game apparatus including a score indicator operated in a relatively step by step fashion by means such as a pawl and ratchet mechanism.

More particularly stated it is an important object of the invention to provide an electrically operated stroke limiting device moved into a plurality of positions with respect to a driving pawl or a ratchet advancing mechanism whereby the stroke of the pawl may be predetermined between minimum and maximum limits.

A further important object of the invention is to provide a yieldable driving connection between the pawl and the actuating means therefor whereby said actuating means may operate in a full stroke or full power range notwithstanding the fact that the pawl driven thereby may be limited in its movement by the aforesaid selectively operable stroke limiting means.

Still more specifically stated, it is an object of the invention to provide in combination an indicator adapted to be moved a maximum amount by a driving pawl or the like, an electrical device to move the pawl in its full driving stroke, and a variable stroke device movable into various positions with respect to the pawl to permit or prevent maximum movement or stroke of the pawl, as desired, whereby the movement of the indicator may be selectively controlled.

It is a further object of the invention to provide as the driving means for the aforesaid pawl, an electromagnetic solenoid and a yieldable driving connection between the pawl and the solenoid whereby the plunger of the solenoid may be moved through its full range or stroke notwithstanding the fact that the pawl may be limited to less than its full stroke by the variable stroke device, one of the purposes of this arrangement being to maintain and permit full stroke movement of the solenoid plunger for purposes of maximum operating efficiency.

It is also an object to provide in combination with a ball playing game an electro-magnetically controlled score device and means controlled by a ball switch for actuating the same, together with an electro-magnetically controlled stroke-varying device for the score device and also controlled by a ball-controlled value switch, such that the score value may be controlled variously in playing the game by the value switch.

A further object is to provide an automatic lock for a score ratchet mechanism, such that during movements of the score device from an advanced to a zero position, various operating pawls are held ineffective either until the ratchet device reaches zero, or until the ratchet device is first stepped away from zero.

Other advantages, novel aspects and features of improvement in the invention relate to details of construction as well as the mode of operation and cooperative relationship of the component parts of the preferred illustrative embodiment shown in the appended drawings in which:

Fig. 1 is a perspective view of a complete variable stroke and step by step indicator combination;

Fig. 2 is a fragmentary elevation of the device of Fig. 1 showing the parts in a certain operated position;

Fig. 3 is a fragmentary elevation of the device of Fig. 1 with the parts in a different operating position;

Fig. 4 is a fragmentary elevation of the device of Fig. 1, modified to include additional safety features and illustrating the reset position of certain parts.

Fig. 5 is a fragmentary perspective of the additional safety pawl structure;

Fig. 6 is a top plan fragment of the showing of Fig. 5, omitting the ratchet disc of the latter view.

Fig. 7 is a circuit diagram.

As viewed in Fig. 1 there is provided a step by step indicating unit including an upright mounting plate 10 upon which is journaled a horizontal shaft 11 to which is affixed a ratchet disc 12 rotating in a plane parallel with the plate. On an opposite side of the plate is an indicating member in the form of a disc 13 upon which are a plurality of indicia characters 14, the disc being fixed on shaft 11 for rotation therewith.

Means for moving the indicating disc in a step by step fashion include a main driving lever 16 pivoted on plate 10 by means of pivot 17. At the upper end of lever 16 is a ratchet pawl 18 having an offset nose 19 (Figs. 2 and 3 also) adapted to engage in the teeth 12a of ratchet disc 12 when lever 16 is pivoted in a clockwise direction, and adapted to drag ineffectively over the teeth 12a when lever 16 is pivoted reversely in an anticlockwise direction.

Driving lever 16 is urged into a normal position by means of a large spring 20 having one end 20a attached to a pin on an offset 18a on the pawl 18 so as to have the dual effect of pivoting pawl 18 in a clockwise direction to urge the nose 19 thereof into positive engagement with the teeth 12a, and as well to urge lever 16 in a clockwise direction, such movement of the main lever 16 being limited by an adjustable stop screw 21 mounted in a bracket 22 on plate 10 and having an end adapted to bear against an offset 16a at the bottom of lever 16.

The ratchet disc 12 is normally urged into a starting position by a coil spring 23 having one end 23a fixed to shaft 11 by a cotter pin 24 which also retains the spring on shaft 11, the opposite end 23b of the spring bearing against the pivot pin 17 for on driving lever 16.

As the ratchet disc 12 is advanced in a clockwise direction by driving means presently to be described, spring 23 is tensioned in an effort to restore the disc to its starting position, however, such return or retrograde movement of the disc is prevented by a releasable stop pawl 30 pivoted on plate 10 as at 31 and having a nose portion 30a (see Figs. 2 and 3 also) disposed opposite the nose 19 of the driving pawl and engaging in teeth 12a normally to prevent such retrograde movement. The stop pawl 30 is normally urged by spring 20 to dispose nose 30a thereof in engagement with teeth 12a, this being accomplished by attaching the opposite end 20b of the spring 20 to a pin 32 on an offset 30b of the stop pawl.

By pivoting the stop pawl 30 in a clockwise direction the nose 30a thereof is withdrawn from teeth 12a and if the driving pawl 18 is similarly raised from the teeth, the disc 12 may rotate in an anti-clockwise direction back to starting position, which position is determined by a fixed stop pin 33 on the back side of plate 10 and which is adapted to engage a stopping pin 34 on disc 12.

The stop pawl may be withdrawn from latching or stopping position by action of an electromagnetic solenoid 40 having its plunger 41 pivotally connected as at 42 to a second offset arm 30c on the stop pawl 30, a pin 43 limiting movement of plunger 41, and hence a pawl 30 in an anti-clockwise direction.

As will be described in detail hereinafter, energization of the reset solenoid 40 rocks the stop pawl 30 to removed nose 30a thereof from teeth 12a; however in order to permit the disc 12 to return to starting position, it is also necessary to raise the driving pawl 18, and to this end the offset portion 30a of the stop pawl is provided with an additional offset finger 30d which underlies a finger 19a on the offset nose 19 of the driving pawl so as to raise the latter when finger 30d raises responsive to a clockwise or releasing movement of the pawl 30 upon energization of solenoid 40. Thus the disc 12 is free for rotation by spring 23 to a starting position.

In order to assure positively accurate displacement of the disc 12 in the advancing direction, and to prevent fraudulent operation of such a device where it is used in connection with a score indicator or the like, there is provided a safety pawl 45 pivoted as at 30X on the offset 30b of the stop pawl, this safety pawl having an offset nose 45a which overlies the offset 19 on the driving pawl 18 when in normal position, thus limiting the vertical displacement possible to the pawl 18 when in said normal position. A slot 46 receives a slot pin 47 upon which finger 45b of the safety pawl rests in normal position.

When the reset solenoid 40 is energized to pivot the reset pawl 30 in a clockwise direction, the safety pawl 45 moves toward the right in a nearly linear displacement to withdraw the stop nose 45a thereof from above the nose 19 on the driving pawl thereby permitting the latter to be raised from engagement with teeth 12a. The location of the pivot 30X with respect to the other reference points of movement of the parts concerned, permits the aforesaid linear movement.

The primary purpose of the safety pawl 45 and associated parts is that of preventing the driving pawl 18 from being thrown upwardly out of engagement with the teeth 12a when the driving pawl reaches the end of its advancing stroke. If it were not for the blocking effect of the safety nose 45a, momentum imparted to the disc 12 and associated parts by driving action of pawl 18 would be sufficient in most instances to cause the nose portion 19 on the driving pawl to be cammed upwardly so that the disc would advance one or more teeth beyond the position into which it would ordinarily advance but for such camming action. Sometimes it is possible by pounding or abruptly moving the device upon which the plate 10 is mounted, as in a game apparatus or the like, that such camming of the driving pawl may be deliberately and fraudulently effected to achieve a higher score or indication than would otherwise be possible. Safety means 45 prevents such camming of the driving pawl in the manner described.

Means for oscillating or actuating the driving lever 16 includes a driving solenoid 50 having a plunger 51 pivotally connected as at 52 to the lower end of a dog-leg lever 53, which is pivoted as at 54 on lever 16. Spring means 55 is attached at one end to a pin 56 at the bend or bight of the dog-leg lever, while the opposite end of the spring is attached to a pin 57 on lever 16 to urge the dog-leg lever in a clockwise direction to a normal position determined by the offset 16a on lever 16.

The dog-leg spring 55 is of sufficient strength normally to prevent pivotal movement of the dog-leg lever when the plunger 51 is attracted toward the right by energization of solenoid 50. However, should the lever 16 be restrained against pivotal movement, the spring 55 would permit the dog-leg lever to break away or pivot at 54 so that the plunger 51 could make its normal full stroke into the bore of solenoid 50.

The foregoing breakaway feature of the connection between the driving lever 16 and the driving solenoid 50 is important in connection with the variable stroke mechanism presently to be described, it being understood moreover that it is desirable for purposes of efficiency to permit the plunger 51 to make its full stroke for the reason that the electromagnetic efficiency of the solenoid, and more particularly the pull on the plunger 51, increases up to a certain point as the plunger 51 is drawn into the bore of the solenoid winding. This arrangement also increases the mechanical efficiency of the pawl and ratchet driving means and assures positive action of the latter.

In its normal operating stroke the lever 16 draws the driving pawl 18 backward (toward the left) a plurality of teeth, say four, so that on the advancing stroke (toward the right of pawl 18) the disc 12 will be rotated a distance corresponding to four of the teeth 12a.

In order to selectively control the distance or displacement through which the ratchet disc 12 may move at a given time, there is provided a means for limiting the stroke of the driving mechanism, particularly the lever 16, to an amount equivalently less than the predetermined number of teeth, in this instance four.

Variable stroke means include a mounting plate 60 which may desirably be attached as at 61 to the plate 10, there being a shaft 62 journaled on plate 60 and carrying a variable stroke disc 63 which is normally urged in an anti-clockwise direction by a coil spring 64 having one end 65 fixed to the shaft 62 by means of a cotter pin 66, while the opposite end 67 of the spring bears against a pin 68 on an advancing lever 69 pivotally mounted on the pin 68 which extends through the lever and is fixed on plate 60.

Stopping formations are placed at various radial distances from the center of rotation of disc 63 for engagement with the driving lever 16 to limit the stroke thereof. These movement limiting formations are preferably in the form of relatively offset surfaces or edge portions 70, 70a, 70b, and 70c, each of which is at a successively lesser radial distance from the first edge portion 70, than its predecessor.

By rotative movement of the variable stroke plate 63 under control of mechanism hereinafter to be described, the relatively offset stop or limiting edges 70, 70c etc. may be positioned selectively opposite the path of movement of an offset arm 16b on the main driving lever 16 of the step up unit. The stopping offset 70c which is at the least radial distance from the center of rotation of disc 63 will permit the greatest pivotal movement of lever 16 in an anti-clockwise direction, whereas the first stop edge or means 70 when positioned in the path of the offset 16b, will permit the least pivotal movement of lever 16.

It will be apparent that the number of the stopping formations or edge portions 70, 70a, etc. may be multiplied as desired.

In order to selectively position the disc 63 for the purpose aforesaid there is provided driving means in the form of an advancing solenoid 75 having a plunger 76 pivotally connected as at 77 to the lower end of lever 69 to pivot the latter in anti-clockwise direction when the solenoid 75 is energized.

Mounted pivotally as at 78 at the upper part of lever 69 is an advancing pawl 79 having an offset 80 disposed to engage in teeth 63a in disc 63. A spring 81 is anchored at one end on pin 82 on the pawl 79 and at its opposite end on the pivot pin 68 for lever 69 with the effect of pivoting the pawl 79 in a clockwise direction to normally dispose the offset nose portion 80 thereof in the teeth 63a of the variable stroke disc.

Lever 69 is disposed in its normal position of Fig. 1 by action of a spring 83 anchored at one end on a pin 84 on mounting plate 60 and at its opposite end on a pin 85 at the upper end of lever 69 thus urging the latter in a clockwise direction and thus withdrawing the solenoid plunger 76 into its outer normal position as shown in Fig. 1.

Each time solenoid 75 is energized lever 69 pivots in an anti-clockwise direction to draw the driving pawl 79 toward the left so that the nose portion 80 thereof may engage with the last tooth 63a in an anti-clockwise direction, and upon de-energization of solenoid 75 the action of spring 83 in restoring lever 69 in a clockwise direction will cause the pawl 79 to urge the variable stroke disc 63 in a clockwise direction, thus tensioning its spring 64.

Means for preventing retrograde movement of the variable stroke disc includes the provision of a stop pawl 90 pivoted on pin means 91 on plate 60 and having an offset stopping nose 92 engageable in teeth 63a beneath an offset 80a on pawl 79. The stop pawl 90 has an arm 90a drivingly connected as at 93 with a solenoid plunger 94 of the selecting solenoid 95. A spring 96 coiled around the pin 91 has one of its ends 96a held against a stop pin 97 for a plunger 94, while its opposite end 96b engages the pawl 90 eccentrically of its pivotal axis and urges the pawl in a clockwise direction so as to dispose the stopping nose 92 thereof in teeth 63a.

Thus when the driving lever 69 is actuated by energization of solenoid 75 as aforesaid, the nose 92 on the stopping pawl rides in teeth 63a and prevents retrograde or anti-clockwise movement of the disc 63.

Means for selectively effecting anti-clockwise movement of the variable stroke disc, includes the selecting solenoid 95 and its connections with the stop pawl 90 such that upon energization of the solenoid 95 nose 92 of the stop pawl 90 is raised from engagement with the disc teeth 63a, nose 92 also engaging the finger 80a on the driving pawl 79 to raise the latter and particularly the offset nose portion 80 thereof free of teeth 63a so that the disc 63 may rotate in an anti-clockwise direction a distance determined by the length of time the stop pawl 90 is pivoted into withdrawn position by energization of solenoid 95.

A sufficient clearance is allowed between the nose 92 of the stopping pawl and the offset 80a on the driving pawl 79 to permit of intermittent operations of solenoid plunger 94 sufficient to assure movement of disc 63 of one tooth at a time. The aforesaid clearance requires that plunger 94 go almost to the end of the stroke before the offset 80a is engaged and raised; thus when solenoid 95 is de-energized, offset 80a will drop back very quickly by action of spring 81 and re-engage in teeth 63a, since 80a is not raised as far from teeth 63a as nose 92. Or if desired, solenoid 94 may be held in attracted position by continued energization of coil 95 a time sufficient to permit disc 63 to rotate clockwise to the limit of its movement, which limit is determined by offset projections 63b on disc 63 disposed to strike against ears 60a on plate 60 for this purpose.

An additional safety feature is shown in the modification of Fig. 4 and the explanatory detail views of Figs. 5 and 6. In Fig. 4 the construction of the main stepping unit is the same as heretofore described with the exception that there is an added safety pawl 100 pivoted on plate 10 as at 101 and having an offset finger 102 projected by clockwise movement of the pawl underneath offset nose portion 30a of the reset pawl to hold the latter in elevated or withdrawn position along with driving pawl 18 so that there will be no interference with the return movement of the ratchet disc 12 by its spring 23. In this sense the safety pawl 100 constitutes a locking device adapted to maintain both the driving and reset pawls in ineffective position until the indicating dial, and hence the associated ratchet disc 12, is restored to normal position, release of the locking pawl being effected by engagement of pin means 103 with the edge of pawl 100 to move the latter in anti-clockwise direction against the tension of its spring 104, which spring normally urges the pawl in a clockwise direction to thrust the locking nose 102 thereof into blocking position beneath the other pawls as aforesaid.

The relationship of the blocking pawls to the advancing and reset pawls is further clarified in Figs. 5 and 6.

*Summary of operation*

In Fig. 7 there is shown a schematic arrangement of the parts including a circuit diagram, which is intended only by way of example to illustrate one arrangement for actuating the indicating mechanism. In this diagram it will be observed that a source of power has been indicated by the conventional representation of a battery B one side of which is connected to a common return or ground Gr. It is to be understood that any suitable source of power may be utilized in such exemplary circuit arrangement.

Assuming that the indicator dial 13 has been left in an advanced position, and that the indicating unit is associated with a ball playing form of game apparatus, another player may approach the apparatus and close a switch 110 completing a circuit via conductor 111 to the reset solenoid 40 thereby energizing the latter to rock the reset pawl 30 to the position shown in Fig. 4 with the nose portion 30a thereof withdrawn from the teeth 12a of the ratchet disc 12. Finger 30d on the reset pawl will also be elevated engaging the underside of the nose portion or offset 19a on the driving pawl 18 and raising the latter from engagement with 12a, thus freeing the disc 12 for anti-clockwise movement under urgence of its spring 23 back to a starting position which will be determined by an engagement of the stop pin 103 with the edge of the safety or locking pawl 100 when the latter moves to the limit of its anti-clockwise range of movement determined by an ear 105 on plate 10.

In the embodiment of Figs. 1 and 2, for example, the limit of such return movement of the ratchet disc 12 would be determined by engagement of the stop pin 34 with stationary stop pin 33 on plate 10.

In the foregoing resetting operation of the embodiment of Fig. 4, it will be observed that the locking nose 102 on the locking pawl is urged beneath the reset pawl, but will be automatically withdrawn when disc 12 is reset.

Referring again to Fig. 7, the reset or selecting solenoid 95 for the variable stroke unit may be simultaneously energized with reset coil 40 provided a switch 112 is moved into engagement with contact 113 to complete an energizing circuit via conductor 114 from solenoid 95 through switch 110 to ground. In such an event (referring to Fig. 1) plunger 94 of solenoid 95 would be attracted downwardly rocking arm 90 so as to raise the nose 92 from teeth 63a against the underside of the projection 80a on the driving pawl for the disc 63 thereby raising the latter also from engagement with teeth 63a and permitting the disc 63 to be rotated in an anti-clockwise direction by spring 64, which would present the greatest or nearest radial stopping formation or edge 70 in a position of alignment with the offset 16b on the driving lever 16 of the step-up unit, thus permitting the latter to make only its minimum stroke movement as illustrated in Fig. 2.

Such a minimum stroke of lever 16 could be caused by engagement with a playing piece or ball 115 (Fig. 7) with switch means 116 closing a circuit via conductor 117 to energize the driving solenoid 50 and cause the plunger 51 to be fully attracted as in Fig. 2 with the offset stopping projection 16b bearing against stop formation 70 restored to its normal position as indicated in Fig. 2 wherein it will be observed that the dog-leg or break-away arm 53 is pivoted out of its normal position against the yieldable connection or spring 55.

Assuming a further play of the game apparatus wherein another ball 120 engages and closes a switch 121 to complete a circuit via conductor 122 to the driving solenoid 75 for the variable stroke driving lever 69, this would cause movement of the plunger 76 (Figs. 1 or 3, also) towards the right pivoting the lever 69 in an anti-clockwise direction and causing a pawl 79 to slip ineffectively back toward the left over the teeth 63a on the variable stroke disc until the plunger 76 had reached the limit of its attracted movement, whereupon the spring 83 (assuming then solenoid 75 to be deenergized as by opening of switch 121) would again urge the lever 69 in a clockwise direction with the nose 80 of driving pawl 79 caught in the teeth 63a to rotate the disc 63 in a clockwise direction until the stop formation or notch 70c of least radius, and hence greatest permissible stroke, is rocked into position opposite the stopping offset 16b and the main driving lever 16 of the step unit as shown in Fig. 3. This would correspond to a high score combination so that the next time a ball 115 were to close switch 116, the score disc would be stepped a maximum amount, for example the distance of four teeth.

If in the foregoing situation, another ball 125 were to engage and close a switch 126, circuit would be closed from the solenoid 95 to raise the reset arm 90 and the driving pawl 79 from teeth 63a permitting an amount of anti-clockwise movement of disc 63 for a length of time depending upon how long the switch 126 remains closed. If desired the ball 125 may be arranged to transiently engage switch 126 thereby closing it only momentarily, in which event the disc 63 would have time to move under urgence of spring 64 a distance of only one of the teeth 63a, thus presenting the stop formation or notch 70b opposite the stop formation 16b on the main driving lever. Another such momentary closing of switch 126 would permit another short movement of the disc 63 to present the next stop formation 70a in stopping position, and so on.

The foregoing illustrative arrangement of Fig. 7 is merely exemplary of one successfully employed embodiment, and it will be appreciated that other arrangements may be utilized and are contemplated. Apart from the novel combination of ball switches to control means for varying the stroke on a stroke-operated score device, importance attaches to the more detailed feature whereby reset solenoid 40 on the stopping unit is energizable to permit the score indicator disc 13 and its driving disc 12 to be restored to a normal starting position while the driving solenoid 50 is energizable by any means to advance the disc 12 one or more steps depending upon the length of stroke the lever 16 is permitted to take. The stroke of lever 16 is governed by the position of the disc 63, and the reset solenoid 95 is energizable for a relatively prolonged period (quite brief in practice) to permit the disc 63 to move in anti-clockwise direction the limit of its range until the formation 70 is in stopping position, which corresponds to the shortest possible stroke for the step-up lever. A briefer or momentary energization of solenoid 95 would permit the disc 63 to move less than its full range in anti-clockwise direction to present one of the intermediate stopping formations in stop position.

Another mode of operation for the variable stroke unit resides in adjusting the length of the stroke of the lever 69 by means of a set-screw 76a so that the pawl 79 would move toward the right a distance of only one tooth. In this manner each energization of the solenoid 75 would correspond to a movement of one of the stop formations 70 . . . 70c, so that if the solenoid 95 were energized by any means to permit disc 63 to move its entire range to a starting position in which the formation 70 would be in stopping position opposite the offset 16b, then each energization of solenoid 75 would effect a step by step movement of disc 63 in the opposite direction to present the intermediate stop formations in succession in stopping position. The circuit connections of Fig. 7 may be utilized without change to procure this operation.

The utility of the locking pawl 100 resides in the fact that fraudulent interference with the normal operation of the mechanism is prevented thereby in those instances where the apparatus is jarred or pounded deliberately with the object of causing the pawls 18 or 30 to reseat before the disc 12 has had time to move all the way back to zero position, thus leaving the apparatus standing with an advanced score instead of a zero score. The locking pawl remains in locking condition once the reset mechanism is actuated, and cannot be withdrawn from locking position until the disc moves into zero position, as by action of the pin 103; or, in an optional arrangement as when the step-up mechanism is first actuated after the device has been reset. The latter arrangement has advantages in some installations because no amount of abuse of the apparatus can cause a dislodgement of the ratchet disc 12 and associated parts from zero position where pin 103 is removed.

A further utility in the locking arrangement resides in the fact that heretofore certain additional means, such as a dash-pot or other slow-acting device has been required to disable the scoring circuits during the time the score dials and ratchets were returning to zero to prevent the possibility of playing the game or apparatus during the interval required for transit of the dial back to zero, as when the player pushes a starting button or operates a coin slide—if the game happens to be coin-controlled—before the reset parts are fully restored to zero position. By locking the essential operating parts as aforesaid, resort to expediencies like the dash pot is avoided, with a result which is at once cheaper, simpler, and more reliable.

While the foregoing description is specific to certain details of construction and operation of the practical embodiment shown, it is to be understood that the appended claims contemplate and include equivalent construction and modes of operation coming within their scope and fair intent.

We claim:

1. In a variable stroke device a main operating lever mounted for oscillation, means for oscillating said main lever, and variable stroke means including a stop member positioned for movement adjacent said main lever and having a plurality of stop formations disposed at varying radial distances from the center of pivotal movement of said member and each positionable by movement of said stop member into a stopping position opposite a portion of said main lever to limit the movement of the latter in one direction, together with means for selectively moving said stop member and including an electromagnetic pawl means cooperable therewith to advance said member in one direction, means yieldably urging said member in an opposite direction, releasable holding pawl means normally preventing said opposite movement, and electromagnetic pawl means energizable to permit release of said holding means and step by step movement of said stop member in said opposite direction.

2. Indicating mechanism comprising in combination a rotatable ratchet disc, an oscillable driving pawl for advancing said disc in a given direction, means tending to rotate said disc in an opposite direction, releasable holding means normally restraining said disc in said opposite movement, means including a reciprocable member always movable in a maximum displacement for oscillating said pawl means, a variable stroke member mounted for pivotal movement about an axis parallel with the axis of movement of said ratchet disc and at a point displaced in a radial sense from the center of oscillation of said driving pawl, said variable stroke member having a plurality of stop formations disposed at varying radial distances from the center of movement thereof opposite said oscillable pawl means and each adapted to be moved into a position of stopping engagement with the latter to limit the strokes thereof, means for effecting movement in opposite directions of said variable stroke member to selectively position said stop formations for the purpose aforesaid, and means providing a yieldable driving connection between said oscillable pawl means and said reciprocable member to permit the latter to move its maximum displacement notwithstanding limitations of movement of the oscillable pawl means, together with means for effecting release of said holding means.

3. In a device of the class described including a pawl and ratchet advancing means movable back and forth to effect advance of an indicator or the like, variable stroke mechanism comprising: a stop member mounted for movement opposite the path of movement of part of said advancing means, said stop member having a plurality stop parts disposable in positions to be engaged by and block the aforesaid part of the advancing means to limit movement of said advancing means different distances depending upon the position of the stop member relative to the aforesaid part of the advancing means, together with electromagnetic control means, means for selectively moving said stop member to selectively limit movement of the advancing means by blocking action as aforesaid.

4. In a pawl and ratchet drive for a rotatable member, an oscillable drive member and pawl means actuated thereby to effect rotative movement of said rotatable member, means for effecting oscillation of said drive member, stop means disposed eccentrically of the axis of oscillation of said oscillable member, a variable stroke disc mounted for oscillation opposite said stop means about an axis approximately parallel with that of the oscillable member and having radially and peripherally offset blocking means positionable selectively by selective movement of said variable stroke disc in blocking position opposite said stop means to limit the displacement of said drive member, spring means tending to move said variable stroke disc in one direction, ratchet means on said variable stroke disc, disengageable holding pawl means normally engaging said ratchet means to prevent movement of the variable stroke disc in said one direction, driving pawl means cooperable with said ratchet means on said variable stroke disc to move the latter in an opposite direction, and means for selectively actuating the several pawl means aforesaid to control the movements of said rotatable member.

5. In a variable stroke device, a pivoted stop disc, means yieldably tending to move said disc in one direction, holding pawl means releasably preventing movement of said disc in said one direction, driving pawl means operable to move said disc in an opposite direction, and stop means offset at various radial distances with respect to the direction of pivotal movement of said disc and each adapted to be disposed in movement—limiting blocking position with respect to a stroke mechanism to be controlled by said variable stroke device, and means for actuating said pawl means to effect pivotal movement said disc to selectively position said stop means for the purpose set forth.

6. In a variable stroke step up unit, a driving lever pivoted between its ends and adapted to be moved in full stroke and less than full stroke displacement, a solenoid having a plunger with predetermined operating stroke in the general direction of operating displacement of one end of said lever and situated near said end, means operatively connected with said lever on the opposite side of its pivot point from said solenoid for yieldably urging the lever in operating movement in a direction opposite to the stroke of the plunger, a break-away lever pivoted on said driving lever near the end thereof adjacent said plunger, spring means urging the break-away lever into a normal position in a direction opposite from the operating stroke of said plunger, and means operatively connecting the plunger and break-away lever to effect movement of the driving lever in one direction upon energization of the solenoid so that said plunger may move in full stroke notwithstanding restraint of the lever against full stroke displacement.

7. In a device of the class described, a pivoted operating lever, a solenoid having a plunger arranged to move in full stroke in a direction tangential to an arc of movement through said lever, and means providing a yieldable driving connection between said lever and plunger to permit the latter to make its full normal operating stroke notwithstanding restraint of said lever against corresponding displacement by the plunger, said means comprising a dog-leg lever pivoted near one of its ends on said operating lever at a point between said plunger and the pivot of the operating lever, spring means connected to the operating lever and the bight of the dog-leg urging the latter into a normal position toward the operating lever and away from the plunger, means limiting movement of this dog-leg by said spring means, and pivotal connection between said plunger and dog leg near the end of the latter remote from its pivot point.

8. In a step-up unit including a ratchet disc adapted to be rotatively moved by pawl means, the combination with said disc of a driving pawl for advancing the disc in one direction, means for moving the disc in the opposite direction, a withdrawable holding pawl normally holding the disc in advanced positions against movement in said opposite direction, a safety locking pawl including a blocking portion adapted to block operative engagement of said driving and holding pawls with said disc when said locking pawl is in a certain position, means tending normally to move the locking pawl into said certain position, means on said locking pawl engaged by said holding pawl when the latter is in operative engagement with said disc to prevent movement of the locking pawl into said certain position, but permitting said movement of the locking pawl as soon as the holding pawl is withdrawn, means for withdrawing the holding and driving pawls, together, and means actuated by said disc in moving in said opposite direction for restoring said locking pawl from said certain position to a normal non-locking position.

9. In a step-up unit, a ratchet member, an advancing pawl for said member, means normally urging said ratchet member to a starting position in a direction opposite to the advance thereof, a holding pawl normally engaged with said ratchet member to prevent movement toward starting position as aforesaid, a safety locking lever, the same yieldingly urged to disengage said holding pawl from the ratchet member and including means cooperating with said holding pawl when the locking lever is moved to a non-locking position to be held in said position until the holding pawl is disengaged from the ratchet member, and means moved by said ratchet member to engage said locking lever and move the latter to non-locking position upon movement of the ratchet member to a predetermined position with respect to said starting position, and means for effecting disengagement of the holding pawl with the ratchet member as aforesaid.

ROBERT H. BREITHER.
HERMAN L. SEIDEN.
CHARLES T. BREITENSTEIN.
FRANK G. NICOLAUS.